US010257245B2

United States Patent
Hobson et al.

(10) Patent No.: US 10,257,245 B2
(45) Date of Patent: Apr. 9, 2019

(54) ASSOCIATION OF USER INTERACTIONS AT A FIRST VENUE WITH THE USER FOR USE IN A SECOND VENUE

(71) Applicant: Disney Enterprises, Inc., Burbank, CA (US)

(72) Inventors: Natalie Hobson, Kelowna (CA); Angela Marchinkow, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 271 days.

(21) Appl. No.: 15/066,231

(22) Filed: Mar. 10, 2016

(65) Prior Publication Data

US 2017/0264661 A1    Sep. 14, 2017

(51) Int. Cl.
*G06F 15/16* (2006.01)
*H04L 29/06* (2006.01)
*H04L 29/08* (2006.01)

(52) U.S. Cl.
CPC ............ *H04L 65/601* (2013.01); *H04L 67/22* (2013.01); *H04L 67/306* (2013.01)

(58) Field of Classification Search
CPC ...... H04L 65/601; H04L 67/22; H04L 67/306

USPC .......................................................... 709/205
See application file for complete search history.

(56) References Cited

U.S. PATENT DOCUMENTS

2007/0155307 A1* 7/2007 Ng ..................... H04H 20/61
                                                                455/3.01
2017/0263029 A1* 9/2017 Yan ..................... G06T 11/60

* cited by examiner

*Primary Examiner* — Alan S Chou
(74) *Attorney, Agent, or Firm* — Farjami & Farjami LLP

(57) ABSTRACT

There is provided a server and method for association of user interactions of a first venue and a second venue. The server including a memory storing a user profile of a user and a hardware processor, wherein the hardware processor may be configured to receive first user interactions of the user with a first system in a first venue, the first user interactions including a request for playing a first media content using the first system in the first venue, store the first user interactions of the user in the user profile of the user in the memory, determine, after storing, the user is in a second venue, retrieve from the user profile, after determining, the first user interactions, and provide, after retrieving, a custom presentation to the user using a second system in the second venue, wherein the custom presentation is based on the first user interactions.

14 Claims, 4 Drawing Sheets

ASSOCIATION OF USER INTERACTIONS AT A FIRST VENUE WITH THE USER FOR USE IN A SECOND VENUE

BACKGROUND

People consume media content in a variety of formats. For example, people engage in a broad range of entertainment activities at different locations and venues, such as watching movies and playing video games at home, and going to movie theaters, theme parks and concert halls. Often, for a period of time, people retain memories of movie scenes, characters and songs, and fantasize about being a part of or reliving the events they have witnessed in movies or being the singer of a song they have listened to recently. In particular, children often wish to role play based on movies, and meet and be recognized by a character from their favorite movies.

SUMMARY

The present disclosure is directed to systems and methods for associating user interactions at a first venue with the user for use in a second venue, substantially as shown in and/or described in connection with at least one of the figures, as set forth more completely in the claims.

DETAILED DESCRIPTION

Figure 1:
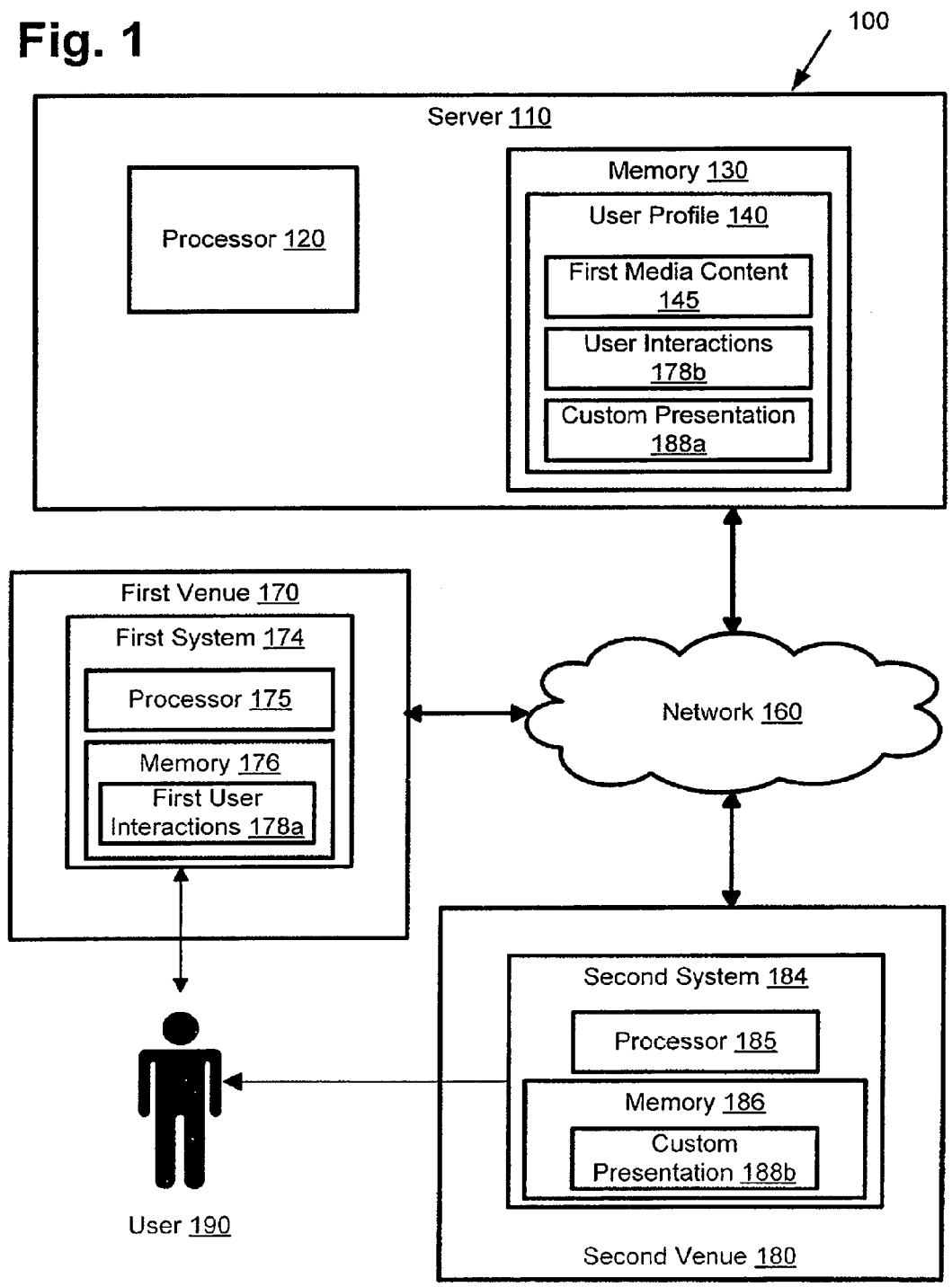
FIG. 1 shows a diagram of an exemplary system including a server for associating user interactions at a first venue with the user for use in a second venue, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows an exemplary system including a server for associating user interactions at a first venue with the user for use in a second venue, according to one implementation of the present disclosure. As shown in FIG. 1, system 100 includes server 110, first venue 170, second venue 180 and network 160. Server 110 includes processor 120 and memory 130, where memory 130 stores user profiles, such as user profile 140. User profile 140 stores information about user 190, which includes first media content 145, stored user interactions 178b, and custom presentation 188a. Processor 120 may access memory 130 to store received input or to execute commands, processes, or programs stored in memory 130, such as first media content 145, stored user interactions 178b, and custom presentation 188a contained in user profile 140. Processor 120 corresponds to a processing device, such as a microprocessor or a similar hardware processing device. Memory 130 stores commands, processes, and programs for execution by processor 120. Memory 130 may be a ROM, RAM, flash memory, or any sufficient memory capable of storing data. First media content 145 may include a movie, a television show, and video game. Moreover, stored user interactions 178b include one or more interactions between user 190 and first system 174, such as a request by user 190 for first media content 145 or user 190 being in proximity of first system 174. Custom presentation 188a includes a plurality of custom presentations stored in user profile 140 in memory 130 of server 110.

According to the implementation of FIG. 1, server 110 is in communication with first system 174 in first venue 170 via network 160. Network 160 may utilize various communication technologies, such as satellite links, Wireless Fidelity (Wi-Fi), Worldwide Interoperability for Microwave Access (WiMax), ZigBee, Bluetooth, Bluetooth low energy, Algorithm Division Multiple Access (CDMA), Evolution-Data Optimized (EV-DO), Global System for Mobile Communications (GSM), Long Term Evolution (LTE), for example.

As shown in FIG. 1, first system 174 includes processor 175 and memory 176. First system 174 may be a device, or a plurality of devices, with user input capabilities, such as a television, a personal computer (PC) or other home computer, a tablet, a smart phone or mobile phone, a personal digital assistant (PDA), or a gaming console. Further, first venue 170, for example, may be a hotel, a commercial store, a home, a theme park, or any other public establishment. First user interactions 178a may include interactions between user 190 and first system 174 at first venue 170. First system 174 stores first user interactions 178a in memory 176. An example of the implementation shown in FIG. 1 may be user 190, who is a child staying with his/her parents at a hotel, or first venue 170, and using the hotel room television, first system 174. In such an implementation, first user interactions 178a may include the child using the hotel television to request playback of a movie about dinosaurs, first media content 145. After user 190 makes the request, server 110 receives first user interactions 178a of user 190 from first system 174 via network 160. Server 110 then stores first user interactions 178a as stored user interactions 178b in user profile 140 of memory 130.

In another implementation, first venue 170 may be a theme park where the child is spending a day and enjoying various rides, including a spaceship roller coaster. Before getting on the ride, a scanning system of first system 174 may require the child to scan his/her wristband. Once the wristband is scanned, the scanning system stores the child's information as first user interactions 178a. Server 110 then receives first user interactions 178a from first system 174 and stores it as stored user interactions 178b. In such an implementation, first user interactions 178a indicate that user 190 has been on the spaceship roller coaster.

In yet another implementation, the child may spend a day at theme park A or first venue 170. One or more photos and/or videos may be created by a plurality of cameras of first system 174 throughout theme park A, such as photos taken with characters in the theme park or at theme park attractions, such as the roller coasters. Server 110 receives such videos and photos, and stores them in user profile 140 of memory 130 as stored user interactions 178b.

FIG. 1 further shows second system 184 at second venue 180. As shown, server 110 is in communication with second system 184 in second venue 180 via network 160. Second venue 180 may be a theme park, a commercial store, a hotel, a home, or any other public establishment. Further, second system 184 may be a system or a plurality of systems including an attraction or a ride in second venue 180, or a device with input capabilities, such as a television, a computer, a tablet, a smart phone or mobile phone, a personal digital assistant (PDA), or a computer controlled machine. Server 110 utilizes network 160 to provide custom presentation 188a to second system 184 to be stored as custom presentation 188b. Custom presentation 188b is based on all or part of the information stored in user profile 140. In one implementation, custom presentation 188b may be one or more portions of first media content 145, where server 110 provides one or more portions of first media content 145 to second system 184. For instance, one or more portions of first media content 145 may be selected based on second venue 180 or a specific location within second venue 180. In another implementation, custom presentation 188b may be content related to stored user interactions 178b, including the request by user 190 for first media content 145.

As an example, in one implementation, after watching the movie about dinosaurs at the hotel room, user 190 may visit second venue 180 or a theme park. Throughout the theme park there may be multiple television displays, screens, or devices, which may recognize when user 190 is in the proximity. For instance, user 190 may be standing in a line waiting to ride a dinosaur roller coaster, where there may be devices that recognize user 190 is in the vicinity. User 190 may be, for example, wearing a communication device, such as a wristband having a tag, a cell phone, a smart watch, or any other computerized device that is able to communicate with and/or announce the presence of user 190 to second system 184.

Having recognized that user 190 is present in the attraction line, the television or screen closest to user 190 may display custom presentation 188b to user 190 as an audio/visual message. For example, the television may display the main dinosaur cartoon character, from the movie user 190 watched at his/her hotel room, saying to user 190 "Hi Adam, I hope you enjoyed watching the dinosaur movie, welcome to the dinosaur ride, I hope you have a blast." Custom presentation 188b may, in another implementation, include a live character greeting user 190 after the live character is notified that user 190 is in the vicinity. For instance, after second system 184 recognizes that the child is standing in line for the ride, server 110 may notify the live character of the child's location enabling the live character to find the child and greet him.

In another implementation where the child has first visited the theme park and enjoyed the spaceship roller coaster, the child may next go to his/her hotel room, i.e. second venue 180, where second system 184 recognizes the presence of the child. This recognition may be performed using a variety of technologies including second system 184 having a wireless communication component to recognize that user 190 has entered the room. In another implementation, after entering the hotel room, the child may turn on the television, which enables second system 184 to recognize that the child is in the room. Having recognized that the child is in the second venue or in proximity of second system 184, the second system 184 may then provide custom presentation 188b to the child.

For instance, using stored user interactions 178b on server 110 indicate that the child has just enjoyed riding a spaceship roller coaster. Accordingly, second system 184 may display a video and/or audio message, custom presentation 188b, to user 190 relating to his/her experience of riding the spaceship roller coaster. For instance, the hotel room television may display a video of a spaceship cartoon with a character saying "Hi Adam, I hope you enjoyed riding my spaceship today at the park, let's now watch an episode of the War of the Spaceships together."

Figure 2:
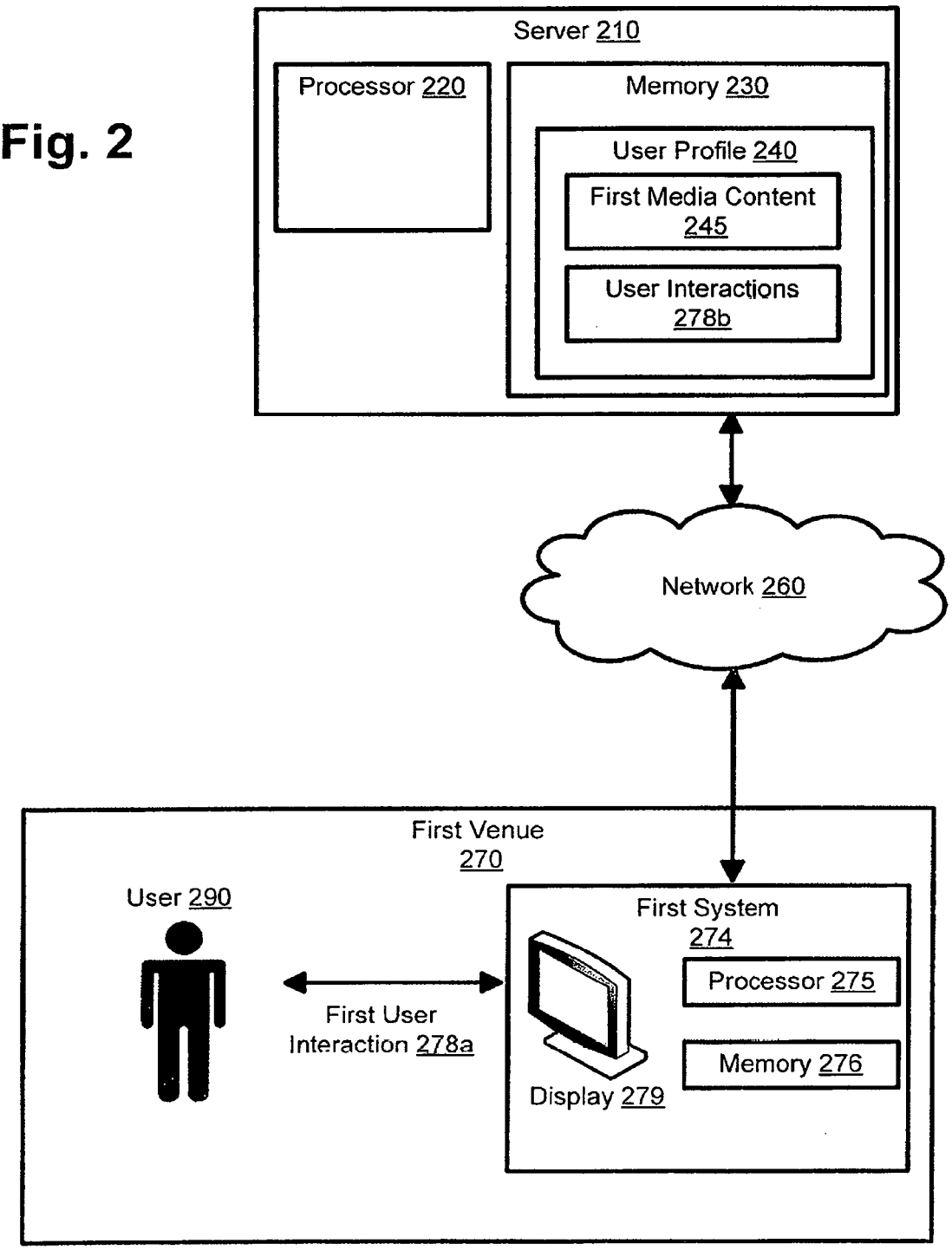
FIG. 2 shows the server in communication with the first venue in FIG. 1, according to one implementation of the present disclosure.

Turning to FIG. 2, FIG. 2 shows server 210 in communication with first venue 270 corresponding to server 110 and first venue 170 of FIG. 1, respectively, according to one implementation of the present disclosure. Server 210 includes processor 220 and memory 230. Further, server 210 uses processor 220 to store user profile 240, which includes first media content 245 and stored user interactions 278b. First media content 245 may include a movie, a television show, and/or a video game. Moreover, stored user interactions 278b include interactions between user 290 and first system 274. Server 210 receives first user interaction 278a, such as a request for first media content 245, over network 260 from first system 274 in first venue 270. Server 210 then stores first user interactions 278a as stored user interactions 278b in user profile 240 in memory 230 of server 210 using processor 220.

In some implementations, first venue 270 may be, for example, a hotel, a commercial store, a home, a theme park, or any other public establishment. User 290 is an individual in first venue 270 that interacts with first system 274. Furthermore, first system 274 includes processor 275, memory 276, and display 279. For example, first system 274 may be a device with user input capabilities, such as a television, a personal computer (PC) or other home computer, a tablet, a smart phone or mobile phone, a personal digital assistant (PDA), or a gaming console.

In some implementations, first user interactions 278a may be user 290 using first system 274 to request playing first media content 245 from server 210. For example, user 290 may be at first venue 270, such as a hotel or hotel room, where user 290 decides to watch first media content 245, for example a movie about cars. User 290 then activates first system 274, a television, within first venue 270, logs on his/her account, and enters a request to play a movie using the television. Next, server 210 receives first user interactions 278a using first system 274 and stores first user interactions 278a, the interactions of user 290 with the television to request a movie about cars, as stored user interactions 278b in user profile 240 in memory 230 of server 210. In one implementation, server 210 then retrieves first media content 245 from memory 230 of server 210 to be transmitted to first system 274 for viewing on display 279. In another implementation, after receiving the request by user 290, server 210 transmits the request to a media content provider. Media content provider may provide first media content 245 directly to first system 274 using a linear program stream or channel, for example. Media content provider may be a subscription video service, a television network, or a radio network, providing media content, such as an audio-visual, video, or audio stream.

In other implementations, first user interactions 278a may be initiated by server 210 using first system 274 to recognize that user 290 is in first venue 270. In such an implementation, first system 274 may determine that user 290 is in proximity of first system 274 and automatically make a request to server 210 for playing first media content 245. For example, after the child enters his/her hotel room, first system 274 may recognize the child is in proximity of first system 274 and connect with server 210 to play the child's favorite movie based on user profile 240 stored in server. In another implementation, after the child enters the room, the child may activate the hotel room's smart television or first system 274, and log into an account associated with the room and its residents, which includes user profile 240 containing information about the child's favorite spaceship cartoon. Server 210 may then retrieve the spaceship cartoon, and transmit the cartoon to first system 274 for playback. In addition, server 210 stores interactions of user 290 with the television in memory 230 as stored user interactions 278*b*. In some implementations, server 210 may also store multiple first user interactions 278*a*. For example, user 290 may request server 210 for multiple movies, such as movie A, movie B, and movie C. In such implementations, server 210 then stores all requests for movies A, B, and C in memory 230 as stored user interactions 278*b*

Figure 3:
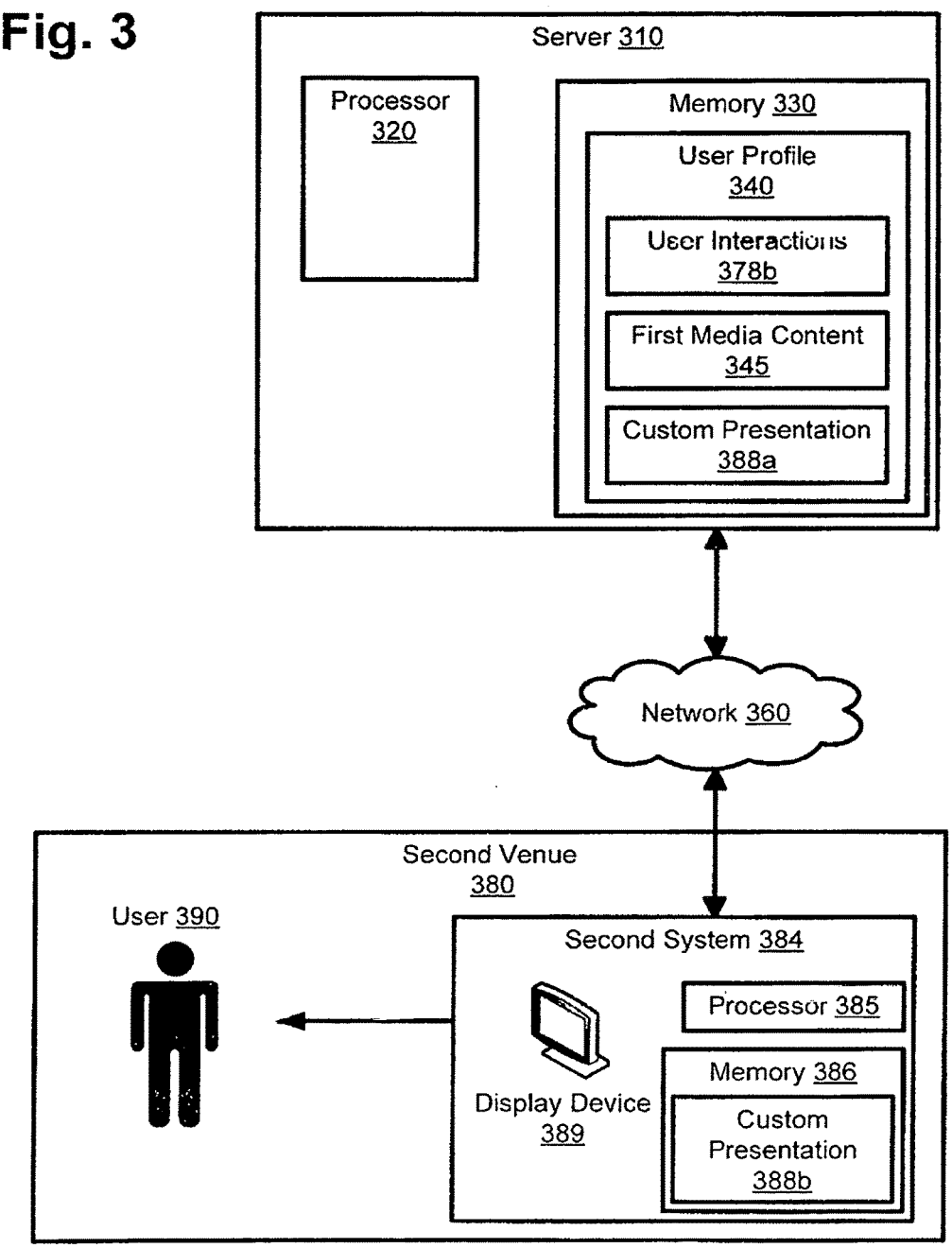
FIG. 3 shows the server in communication with the second venue in FIG. 1, according to one implementation of the present disclosure.

Referring to FIG. 3, FIG. 3 shows server 310 in communication with second venue 380 corresponding to server 110 and second venue 180 of FIG. 1, respectively. Server 310 includes processor 320 and memory 330, which stores user profile 340, stored user interactions 378*b*, first media content 345, and custom presentation 388*a*. Stored user interactions 378*b* include interactions of user 390 previously stored in memory 330. First media content 345 includes a movie, a television show, and/or video game. Custom presentation 388*a* includes a plurality of custom presentations. Furthermore, server 310 may retrieve custom presentation 388*a* based on stored user interactions 378*b*, such as a stored request for first media content 345, to provide custom presentation 388*a* to second system 384 in second venue 380.

In some implementations, second venue 380 includes a theme park, a commercial store, a home, or a public establishment. Second system 384 includes processor 385, memory 386, and display device 389. Second system 384 may be an attraction, a ride, a device with input capabilities, such as a television, a computer, a tablet, a smart phone or mobile phone, a personal digital assistant (PDA), or a computer controlled machine located at second venue 380. For example, user 390 may be at a theme park and enter an attraction, such as a spaceship roller coaster associated with second system 384. Second system 384 may include a plurality of systems each placed throughout second venue 380 or a specific location within second venue 380. For example, user 390 may be standing in line at a popular attraction, such as a roller coaster related to an animated children's movie.

While standing in line, user 390 may be recognized by second system 384 using a wireless device possessed by user 390, facial recognition, scanning a token possessed by user 390, etc. In response, second system 384 may select custom presentation 388*b* based on user profile 340 of user 390. For example, user profile 340 may contain information relating to the favorite character of user 390 in a movie based on user interactions by user 390 in another venue, such as user 390 interactions in a hotel room, e.g. watching a batman movie. Custom presentation 388*b* may be a message from user 390 favorite character, e.g. batman, to user 390. Further, custom presentation 388*b* is presented on display device 389 of second system 384 at second venue 380 as a video and/or audio message. For example, custom presentation 388*b* may be an audio message, such as a theme song or sound clip from the batman movie. Also, custom presentation 388*b* may be a video clip of batman greeting user 390. In some implementations, custom presentation 388*b* may be one or more portions of first media content 345, where second system 384 may receive one or more portions of first media content 345 from server 310. Also, one or more portions of first media content 345 may be selected based on second venue 380 and/or a specific location within second venue 380. For example, custom presentation 388*b* may be a video clip, specifically an air plane race, from a movie about air planes when user 390 rides an air plane attraction at theme park A.

In one implementation, custom presentation 388*b* may be a photo and/or video of user 390 with a custom overlay. While the user is on an attraction in a theme park, the photo and/or video of user 390 may be taken by second system 384. In such an implementation, second system 384 may be a camera on a roller coaster that takes photos or videos of user 390 while on the ride. After taking photos or recording user 390, second system 384 then sends the photos and/or video to server 310, where server 310 overlays the photo and/or video with the custom overlay. The custom overlay is stored in server 310 and is selected based on first media content 345 and/or user profile 340. For example, the custom overlay may feature a race car design taken from first media content 345, such as a race car movie, that user 390 had previously requested and watched in another venue, such as the hotel room. After overlaying the photo and/or video with the custom overlay, server 310 then sends the photo and/or video with the custom overlay back to second system 384.

In another implementation, custom presentation 388*b* may be an audio and a pre-programmed movement routine presented by second system 384, where second system 384 includes a computer controlled machine, such as a robot. The pre-programmed movement routine may correspond to dance movements or animatronics of second system 384, such as a robot of an attraction, in second venue 380 and/or a specific location within second venue 380. In this example, user 390 may ride an attraction that contains dancing and singing animatronics or robots. At some point during the ride, a specific or random robot may dance differently than the rest of the robots for user 390 and present custom presentation 388*b*, such as a greeting, a farewell, a riddle, or a personalized message to user 390. For example, a child may ride an attraction about bugs that has robotic bugs singing and dancing, where the main bug character waves farewell to the child and provides a personalized message. The child may be recognized by the robot bug due to the child's cell phone, smart watch, or a tag possessed by the child. Further, the pre-programmed movement routine may vary depending on the first media content 345 and/or user profile 340.

In some implementations, second venue 380 may have a plurality of attractions each having second system 384. Custom presentation 388*b* may be one or more portions of first media content 345, where each second system 384 may receive one or more portions of first media content 345 from server 310. For example, at the entrance of a first theme park attraction of second system 384, user 390 is recognized as entering the first theme park attraction, using a wireless device possessed by user 390, facial recognition, etc. Further, when user 390 enters a second theme park attraction, another second system 384 recognizes the user 390. Each second system 384 may present the one or more portions of custom presentation 388*b* to user 390. Further, each of the plurality of attractions having second system 384 may sequentially present one of the portions of first media content 345, which make up custom presentation 388*b*. Also, one or more portions of first media content 345 may be selected based second venue 380 or a specific location within second venue 380. For example, if the first theme park attraction includes a car race, a portion of batman movie showing the bat mobile racing may be shown, and if the second theme park attraction includes a fighting scene, a portion of batman movie showing batman fighting the villains may be shown.

Figure 4:
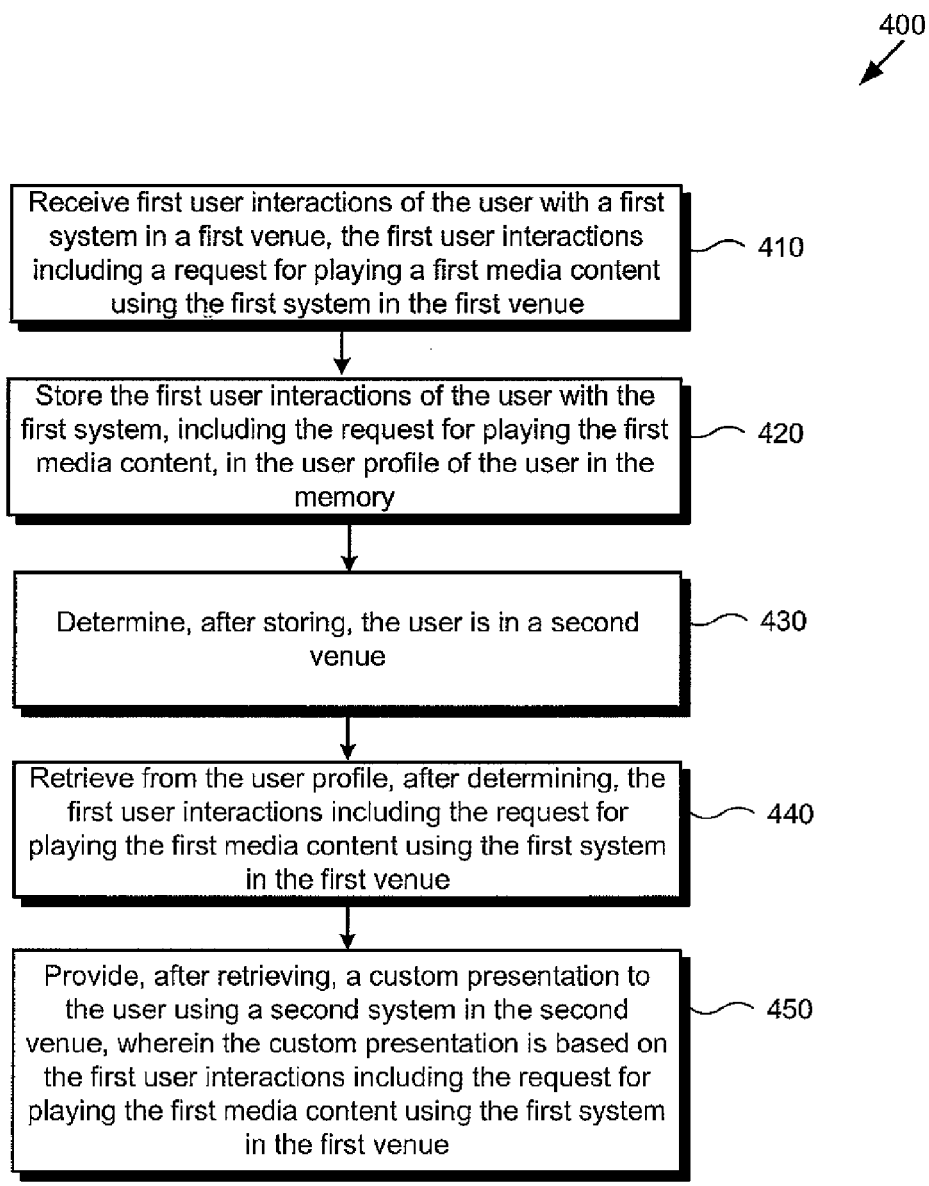
FIG. 4 is a flowchart presenting an exemplary method for associating user interactions at the first venue with the user for use in the second venue, according to one implementation of the present disclosure.

FIG. 4 is a flowchart presenting an exemplary method for associating user interactions at the first venue with the user for use in the second venue, according to one implementation of the present disclosure. Referring now to step 410, processor 120 of server 110 receives first user interactions 178*a* of user 190 with first system 174 in first venue 170. First user interactions 178*a* include a request for playing first media content 145 using first system 174 in first venue 170, such as a hotel room. In one implementation, processor 120 of server 110 may determine user 190 is at first venue 170 based on the request for playing first media content 145. In another implementation, processor 120 of server 110 may determine that user is at first venue 170 based on the location of user 190 at the time the request for the movie is made. For instance, a father and his daughter, user 190, may be at a restaurant, first venue 170, where the daughter makes a request to watch a princess movie, first user interactions 178*a*, on the father's phone, first system 174.

After receiving the request from user 190, in one implementation, processor 120 then retrieves first media content 145 from memory 130 of server 110 to be transmitted to first system 174 for viewing by user 190. In another implementation, after receiving the request from user 190, processor 120 may transmit the request to a media content provider. The media content provider then retrieves and transmits first media content 145 to first system 174. Further, first media content 145 may be received from memory 130 of server 110, or may arrive from another source, such as an independent database, a media content provider, a television network, or a radio network.

Turning to step 420, processor 120 of server 110 stores first user interactions 178*a* of user 190 with first system 174, including the request for playing first media content 145, as stored user interactions 178*b* in user profile 140 of user 190 in memory 130. Alternatively, processor 120 of server 110 may store first user interactions 178*a*, including the request for first media content 145, in an external database for a subsequent retrieval. Server 110 stores the request for the princess movie made by user 190 while at the restaurant in user profile 140.

At step 430, processor 120 of server 110 determines, after storing, user 190 is in second venue 180. Second venue 180 may be a theme park, a commercial store, or a public establishment. In one implementation, server 110 may determine user 190 is in second venue 180 by using data received via network 160. For example, server 110 may determine that a father and his daughter have left the restaurant and are now at a toy store by receiving GPS location from the father's phone via network 160. As another example, the location of user 190 may be determined using a camera, a tag reader, etc. at second venue 180. At step 440, processor 120 of server 110 retrieves from user profile 140, after determining, stored user interactions 178*b* including the history of playing first media content 145 using first system 174 in first venue 170. For example, after determining that the father and daughter are at the toy store, server 110 retrieves information relating the daughter's request to watch a princess movie at the restaurant.

Turning to step 450 of flowchart 400, processor 120 of server 110 provides, after retrieving, custom presentation 188*b* to user 190 using second system 184 in second venue 180, wherein custom presentation 188*b* is based on first user interactions 178*a* including the request for playing first media content 145 using first system 174 in first venue 170. For instance, having recognized the daughter is currently at the toy store, server 110 may send a message to user's 190 phone, which includes a video message from the princess in the princess movie. The video message may thank the daughter for watching her movie and inform the daughter that the princess can be found at aisle A of the toy store.

In another example, user 190 may be at a concert, first venue 170, watching a musical performance. Server 110 recognizes that user 190 is at the concert watching the musical based on the location of user's 190 phone, and stored server 110 stores user's 190 attendance in user profile 140 in memory 130. Subsequently, server 110 determines that user 190 has arrived at home, second venue 180, for example, based on user 190 use of his/her home computer, phone, set-top box, etc. In response, server 110 retrieves information relating to user's 190 attendance at the musical, and provides custom presentation 188*b*, such as a video message to user 190 via the computer, phone set-top box, etc. The message may contain a video from the cast of the musical thanking them for attending the musical performance, or may be an offer to purchase a copy of the musical at a discount for attending the musical. The message may also suggest other musical that user 190 may wish to attend.

In another example, user 190 may visit first venue 170, such as theme park A. While at theme park A, one or more photos and/or videos may be created by first system 174, e.g. a plurality of cameras existing throughout theme park A. Server 110 receives these photos and stores them in user profile 140 in memory 130. When server 110 determines that user 190 is no longer at theme park A, server 110 transmits a message second system 184, such as user's 190 phone. The message may contain one or more photos and/or videos of user 190 at theme park A, as custom presentation 188*b*. Further, processor 120 of server 110 may organize the pictures based on user profile 140 including user interactions 178*b*, such that all the princess photos may be shown first. Alternatively, processor 120 of server 110 may provide the photos and/or the videos as a collage of photos and/or videos, where the collage is organized based on user profile 140 including user interactions 178*b*.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A server comprising:
a memory storing a user profile of a user; and
a hardware processor configured to:
receive first user interactions of the user with a first system in a first venue, the first user interactions including a request for playing a first media content including a movie character using the first system in the first venue;

store the first user interactions of the user with the first system, including the request for playing the first media content, in the user profile of the user in the memory;

determine, after storing, the user is in a second venue;

retrieve from the user profile, after determining, the first user interactions including the request for playing the first media content including the movie character using the first system in the first venue; and provide, after retrieving, a custom presentation including the movie character to the user using a second system in the second venue, wherein the custom presentation is based on the first user interactions including the request for playing the first media content using the first system in the first venue;

wherein the second venue has a ride, and wherein the ride presents one of a plurality of segments of the custom presentation including the movie character.

2. The server of claim 1, wherein the second venue is a theme park.

3. The server of claim 1, wherein the custom presentation includes a photo of the user with a custom overlay, wherein the photo is created by the second system, wherein the custom overlay is based on the first media content.

4. The server of claim 1, wherein the ride sequentially presents the plurality of segments of the custom presentation.

5. The server of claim 1, wherein the custom presentation includes a video and an audio.

6. The server of claim 1, wherein the custom presentation includes one or more portions of the first media content.

7. The server of claim 1, wherein the second system is a computer controlled machine, wherein the computer controlled machine provides the custom presentation, wherein the custom presentation includes an audio and a pre-programmed movement routine, wherein the pre-programmed movement routine corresponds to dance movements of a robot at the second venue.

8. A method for use by a server including a hardware processor and a memory storing a user profile of a user, the method comprising:

receiving, using the hardware processor, first user interactions of the user with a first system in a first venue, the first user interactions including a request for playing a first media content using the first system in the first venue;

storing, using the hardware processor, the first user interactions of the user with the first system, including the request for playing the first media content including a movie character, in the user profile of the user in the memory;

determining, using the hardware processor and after storing, the user is in a second venue;

retrieving from the user profile, using the hardware processor and after determining, the first interactions including the request for playing the first media content including the movie character using the first system in the first venue; and providing, using the hardware processor and after retrieving, a custom presentation including the movie character to the user using a second system in the second venue, wherein the custom presentation is based on the first user interactions including the request for playing the first media content using the first system in the first venue;

wherein the second venue has a ride, and wherein the ride presents one of a plurality of segments of the custom presentation including the movie character.

9. The method of claim 8, wherein the second venue is a theme park.

10. The method of claim 8, wherein the custom presentation includes a photo of the user with a custom overlay, wherein the photo is created by the second system, wherein the custom overlay is based on the first media content.

11. The method of claim 10, wherein the ride sequentially presents the plurality of segments of the custom presentation.

12. The method of claim 8, wherein the custom presentation includes a video and an audio.

13. The method of claim 8, wherein the custom presentation includes one or more portions of the first media content.

14. The method of claim 8, wherein the second system is a computer controlled machine, wherein the computer controlled machine provides the custom presentation, wherein the custom presentation includes an audio and a pre-programmed movement routine, wherein the pre-programmed movement corresponds to dance movements of a robot at the second venue.

* * * * *